(12) United States Patent
Kristjansson

(10) Patent No.: US 9,679,581 B2
(45) Date of Patent: Jun. 13, 2017

(54) SIGN-LANGUAGE VIDEO PROCESSOR

(71) Applicant: Trausti Thor Kristjansson, Sunnyvale, CA (US)

(72) Inventor: Trausti Thor Kristjansson, Sunnyvale, CA (US)

(73) Assignee: Trausti Thor Kristjansson, Sunnyvale, CA (US)

( * ) Notice: Subject to any disclaimer, the term of this patent is extended or adjusted under 35 U.S.C. 154(b) by 58 days.

(21) Appl. No.: 14/868,543

(22) Filed: Sep. 29, 2015

(65) Prior Publication Data
US 2017/0092293 A1   Mar. 30, 2017

(51) Int. Cl.
| | |
|---|---|
| H04N 5/775 | (2006.01) |
| G10L 21/10 | (2013.01) |
| H04N 5/765 | (2006.01) |
| G11B 27/031 | (2006.01) |
| H04N 21/2743 | (2011.01) |
| G06K 9/00 | (2006.01) |
| H04N 5/91 | (2006.01) |

(52) U.S. Cl.
CPC .......... *G10L 21/10* (2013.01); *G06K 9/00355* (2013.01); *G11B 27/031* (2013.01); *H04N 5/765* (2013.01); *H04N 5/91* (2013.01); *H04N 21/2743* (2013.01)

(58) Field of Classification Search
CPC .. G10L 21/10; G06K 9/00355; G11B 27/031; H04N 5/765; H04N 5/91; H04N 21/2743
USPC ......................................................... 386/230
See application file for complete search history.

(56) References Cited

U.S. PATENT DOCUMENTS

| | | | |
|---|---|---|---|
| 2010/0318907 A1* | 12/2010 | Kaufman ............. | G11B 27/034 715/706 |
| 2011/0231194 A1* | 9/2011 | Lewis ..................... | G10L 21/06 704/276 |
| 2014/0046661 A1* | 2/2014 | Bruner ............... | H04N 21/4884 704/235 |
| 2016/0073029 A1* | 3/2016 | Markovitz .......... | H04N 5/2621 348/333.01 |

* cited by examiner

*Primary Examiner* — William Tran

(57) ABSTRACT

The present invention relates to implementing a system and method for enhancing the recording of a sign-language video by automatically associating the prompter text with the segment(s) of the sign-language video recording. The segment(s) of the sign-language video recording is automatically determined based on the phrases identified within the video recording. Further, the system and method implements a plurality of features to manage the sign-language video and facilitates a means to actively collaborate, upload, and store the sign-language video within the network.

22 Claims, 15 Drawing Sheets

Prompt Import:

Copy and paste your prompts into the text field below.
To separate prompts, use one empty line between prompts.

WXYZ - funny story

You use WXYZ often

But I bet you cannot remember the order of colors

Blue Red Yellow Blue Green

[ Clear Text ]   [ Create Placeholder Clips with Prompts ]   [ Clear Text ]

FIG. 10b

SIGN-LANGUAGE VIDEO PROCESSOR

FIELD OF THE INVENTION

The present invention generally relates to sign-language video recording and more particularly relates to automatically associating a prompter text with one or more segments of the sign-language video and implementing a plurality of features for efficiently recording and managing the sign-language video segment(s) on a mobile device.

BACKGROUND OF THE INVENTION

Video is the best medium to record and distribute sign language content. However, composing or creating sign language videos requires expensive camera equipment and complicated software such as nonlinear video editors (Adobe Premier, FinalCut Pro and so on). Composing sign language documents has therefore been a laborious, complicated and slow process. Further, a sign language is not easily recorded on paper (that is the sign language does not have a written form) and the best way to record the sign language is through a video. However, it is difficult to record long videos by memorizing the sequence continuously. To address this issue, the Prompter devices that are available in the market can be used to make long monologues recording easier. But the prompter devices need to be manually controlled to increment the position of the prompter text and have to be configured to control the prompter text in association with a moving video. Hence, the need for simplifying the recording of the sign-language video becomes imperative.

In order to overcome the existing limitation, there is a need for implementing a method for a mobile device that enhances the sign-language video recording to efficiently manage and allow the users to collaborate on sign-language video recording within a network.

The method for enhancing the sign-language video recording implements a motion detection technology to determine the motion of the sign-language video, which is used in conjunction with the Sign Activity Detection technology to automatically determine the position of the prompter text in association with the motion of the sign-language video.

SUMMARY OF THE INVENTION

The present invention relates to implementing a system and method in a mobile device for enhancing the recording of a sign-language video by automatically segmenting one or more phrases identified in a sign-language video recording and associating a text from an in-built teleprompter, wherein said method comprises of facilitating an in-built teleprompter for feeding in the prompter text by the user before recording the sign-language video. Further, the method comprises of facilitating automatic recording of the sign-language video corresponding to the gesture movement of a presenter, which is detected using a graphical processing unit (GPU) that can be automatically synchronized with the prompter text, and facilitating an automatic segmentation based on one or more phrases associated with the recorded sign-language video. Further, the method facilitates automatic collaboration, uploading, and storing the recorded sign-language video on a cloud server and automatically associates the prompter text facilitated from the in-built teleprompter with one or more segments identified in the recorded sign-language video as a text title. Further, the method facilitates automatic controlling of the position of the prompter text corresponding to one or more segments associated with the sign-language video recording and implement a plurality of features on the mobile device to enhance the recording of the sign-language video.

BRIEF DESCRIPTION OF DRAWINGS

FIGS. 10a and 10b illustrate exemplary screen-shots for generating the prompter text to be automatically associated with the segment(s) of the sign-language video recording.

FIGURE DESCRIPTION

Figure 1:
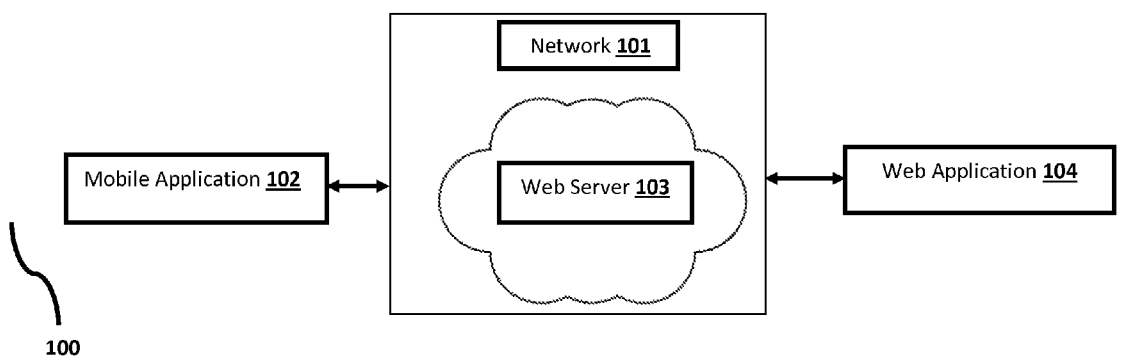
FIG. 1 illustrates a working overview of the system 100 implementing a method of enhancing the recording of a sign-language video on a mobile device.

100—A system overview
101—A network within which the method for enhancing the sign-language video recording is implemented
102—An application installed in a mobile device
103—A web server or a cloud server configured to store the digital format of the sign-language video recording
104—A web application used for managing the sign-language video recording.
300—Depicts the signal associated with the motion activity detector
340—Depicts the components of the Sign activity detector
350—Depicts a motion state activity transition diagram
360—A motion estimator component
362—A motion smoother component
364—A state machine component
370—Explains the process of sign activity detection
400—Depicts the state diagram for motion detection and PRE-RECORDING-BUFFER recording
500—A process explaining the method for enhancing the sign-language video recording 600—A system overview of components used to enhance the sign-language video recording
601—An Application module
602—A Display module
603—A Graphical Processing Unit (GPU) module
604—A Storage module
605—A Feature Enablement module
606—A Segmentation module
607—A Mapping module
608—A Controlling module
700—A mobile interface with composer user interface for managing the sign-language video recording projects and/or the video recording clips.
701-709—Depicts mobile interface with composer user interface for managing the sign-language video frames or video clips including the project.
801, 801b—A user interface for managing and creating sign-language video recording projects.
900—A mobile interface displaying the prompter text for recording the sign-language video
910—A user interface for closing the prompter text
920—A user interface for traversing the video frames backwards
930—A user interface for traversing the video frames forward
940—A user interface for selecting the recording mechanism
950—A button to start the video recording
960—A recording indicator
970—A motion strength indicator bar
980—A prompter text displayed on the mobile interface

DETAILED DESCRIPTION OF THE INVENTION

The following detailed description of the preferred embodiments presents a description of certain specific embodiments to assist in understanding the claims. However, the present invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be evident to one of ordinary skill in the art that the present invention may be practiced without these specific details.

In an embodiment, the mobile application 102 installed in a mobile device refers to a device that can be used for recording a video, which is configured with an in-built teleprompter for automatically generating the prompter text to be associated with the recorded video. Further, the mobile device can be configured with a web application 104 for managing a video project that result from the recording of the video. For example, the mobile device can be a smart phone, a mobile phone, a laptop, a tablet, a personal computer, or the like.

The term mobile interface or user interface refers to an interface supported by the web application 104 for managing the video clips and/or the sign-language video projects.

Referring to FIG. 1 illustrates a working overview of the system 100 implementing a method of enhancing the recording of a sign-language based video on a mobile device. As depicted in the figure, the system 100 is configured for easily creating and sharing a sign-language video within a network 101, wherein the system 100 comprises of the following major components: a mobile application 102 for recording and editing the sign-language video projects, a Web server 103 or a cloud based server for online storage of video projects and collaboration, and a web application 104 for management of project and collaboration. In an embodiment, the mobile application 102 is configured to provide the following basic video capturing and editing capabilities: facilitating video recording in high definition and at high frame rates, facilitating composition of individual clips into longer videos, providing an editor for reordering the sequence of clips, providing an editor for trimming individual clips, exporting of frames from video clips, facilitating transition effects, facilitating titles and graphics overlay for the frames, facilitating exporting of compositions, facilitating automatic uploading capability to online video platforms such as YouTube and Face book.

In an embodiment, the Network 101 comprises of a cloud server or a web server 103 to provide a storage facility, wherein the Web server 103 or a cloud-based server facilitates the following primary functions for the user: provide a user account management for the user to login to the application 102, facilitate storage and synchronization of projects, facilitate collaboration of projects: for example sending projects from one user to another, facilitate user signup and subscription payment mode.

In an embodiment, the Web Application 104 gives users the ability to manage and collaborate projects with other users within the network 101. For example, users can duplicate, delete, and/or send video recorded projects to each other through the Web application 104 within the network 101. In an embodiment, the collaboration feature allows the Web application 104 to be compatible with online learning platforms such as Google Classroom and other Learning Management Systems. The Web Application 104 comprises of a Landing Page, a Sign in page and/or Project List Organizer screen(s) and a Project Payer Page.

In an embodiment, the system 100 is configured to implement a Sign Activated Recording (SAR) feature that recognizes the motion of the signer in the video for automatic segmentation of phrases and trimming of clips while recording the sign-language video within the network 101. Further, the system 100 is configured to associate the text snippets with each clip and the text snippets can be used as notes, prompts, and subtitles or exported as continuous text. Further, the system 100 is configured to support a built-in teleprompter to retrieve and display the prompter text and the system 100 allows the Sign Activated Recording (SAR) feature to work in coordination with the prompter text for automatic progression of prompts while recording the sign-language video. Further, the system 100 is configured to automatically upload the media and the metadata to the cloud for storage, collaboration and backup of the sign-language video recording. Further, the system 100 is configured to associate a second mobile device or Bluetooth keyboard with the mobile application 102 as a remote control to initiate a recording start and stop event. Further, the system 100 is configured to facilitate a speech activated teleprompter that can convert the voice into the prompter text which in turn can become a subtitle for the video recorded sign-language.

Figure 2:
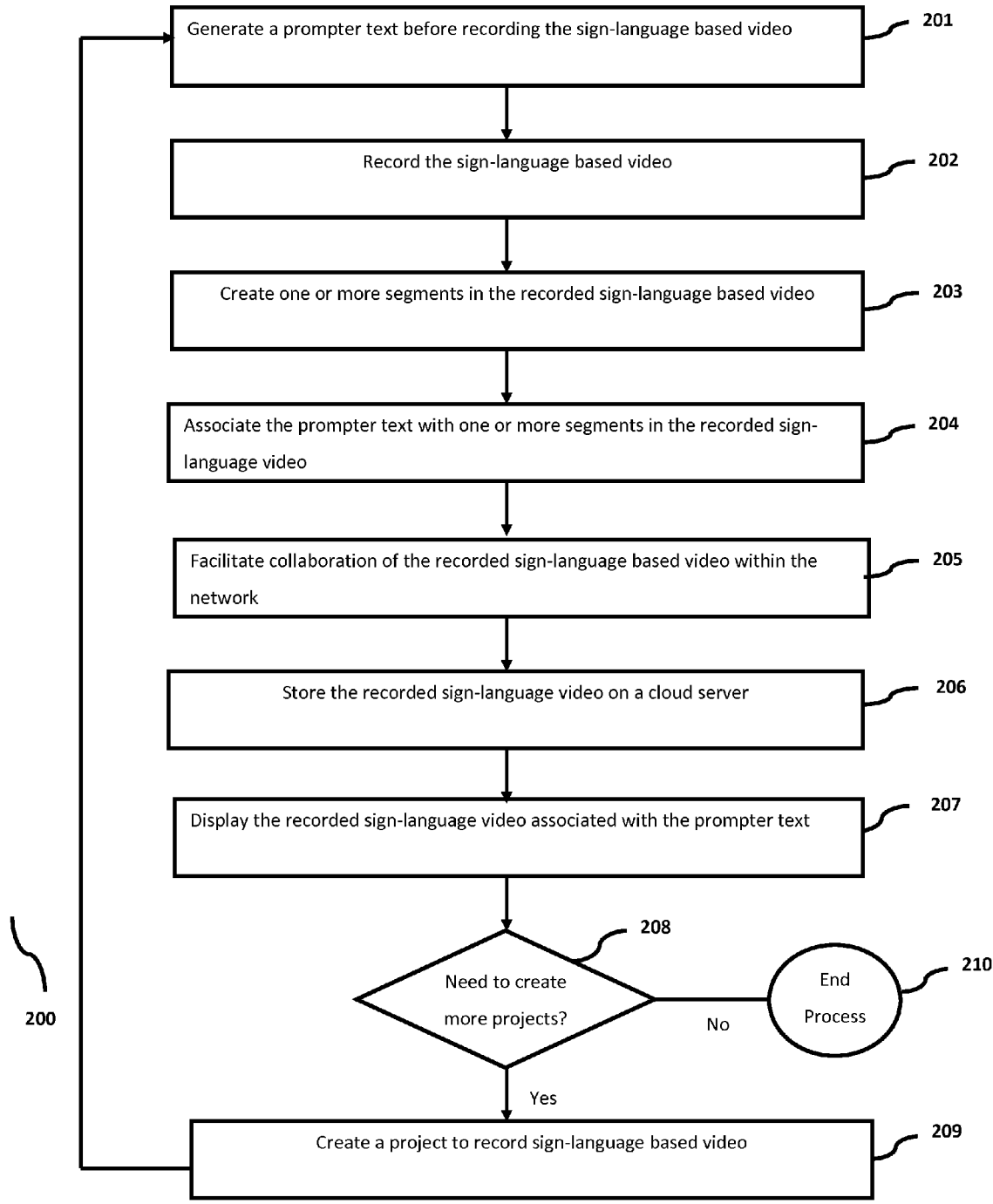
FIG. 2 illustrates a flow-chart 200 that explains the process of enhancing the recording of the sign-language video on the mobile device.

Referring to FIG. 2 illustrates a flow-chart 200 that explains the process of enhancing the recording of the sign-language video on the mobile device. Initially, at step 201, the method 200 allows the user to load a sequence of prompter texts into an in-built teleprompter, wherein the prompter text can act as a sequence of instructions or as a sequence of cue card for the user to record the sign-language video. In an embodiment, the system 100 is configured to allow the user to import the prompter text from various sources and/or to type in the prompter text manually through the mobile application 102. At step 202, the method 200 allows the user to record the sign-language video either manually by allowing the user to select the start/stop recording event through the web application 104 or by automatically recognizing the gesture movement of a presenter. In one embodiment, the method implements a Sign Activated Recording (SAR) feature using the GPU (Graphical Processing Unit) to estimate the motion in the live video stream. At step 203, the method 200 automatically creates one or more segments based on the phrase(s) identified within the recorded sign-language video. At step 204, the method 200 automatically associates the generated prompter text with one or more segments of the recorded sign-language video. In an embodiment, the system 100 associates the prompter text with one or more segments of the recorded sign-language video by implementing a motion detector technology/fragment buffering technology in conjunction with the Sign Activated Recording technology. Further, at step 204, the method 200 displays the recorded sign-language video associated with the prompter text and adds the capability to automatically increment the prompter position based on the output of the motion and gesture detection.

The sequence of prompter texts can be used in number of ways, for example: the prompter text can be used as cue cards with reminders that aid the presenter in planning the sequence of presentation or the text can be shown in the prompter when translating from spoken/written language to a sign language. Further, the text can be rendered and overlaid over the video (open captions) or exported for later synchronization (closed captions). Optionally, the prompter text can be joined into one document for further editing, which can be useful for users primarily communicating in sign language who prefer to compose in sign language and later translate the sign language to written language. Further, at step 205, the method 200 facilitates collaboration of the recorded sign-language video within the network 101; and at step 206, the method 200 uploads and stores the recorded sign-language video on a cloud server 103. Further, at step 207, the method 200 determines if more sign-language video projects are to be created in the mobile application 102 through the web application 104. At step 209, if the user determines to create one or more projects, then the mobile application 102 allows the user to determine the prompter text for planning the sequence of recording. Otherwise, the process is terminated at step 210.

Figure 3A:
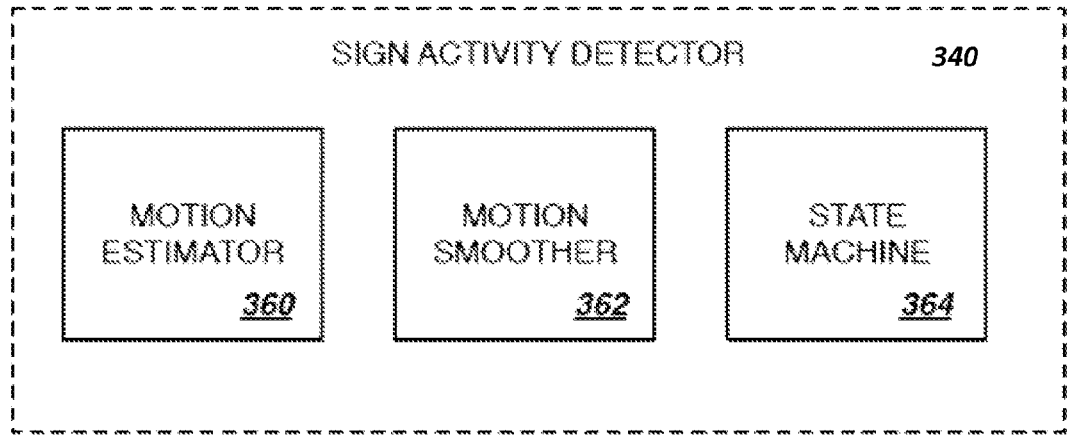
FIG. 3a illustrates the components of the Sign Activity Detector 360.

Referring to FIG. 3a illustrates the components of the Sign Activity Detector. In an embodiment, the Sign Activity Detector 340 comprises of 3 parts, a Motion estimator 360 that runs on a Graphical Processing Unit (GPU), a Motion smoother 362 that can be a single pole IIR low pass filter or an FIR low pass filter, and the state machine 364 that determines the state of the motion.

Figure 3B:
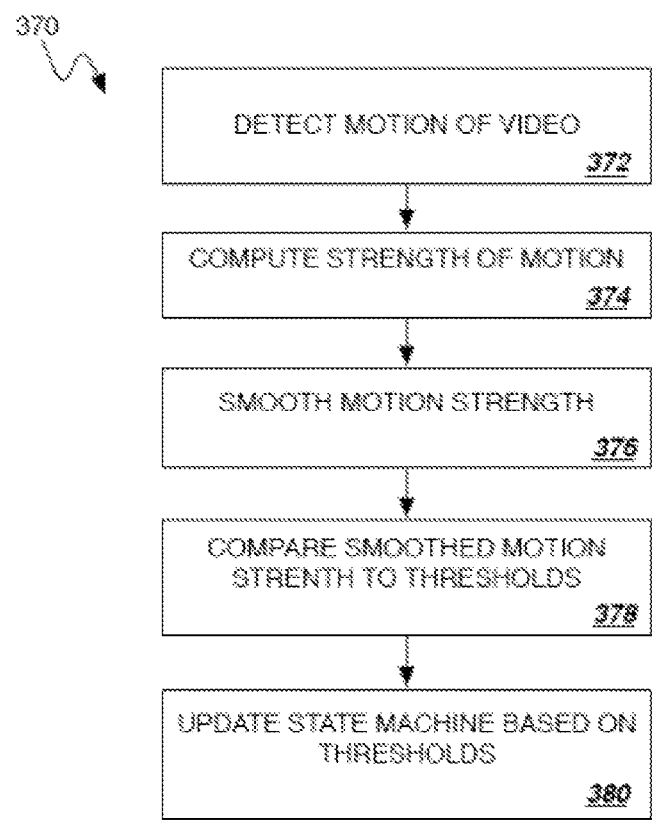
FIG. 3b illustrates a flow-diagram 370 explains the process of sign activity detection.

Referring to FIG. 3b illustrates a flow-diagram that explains the process of sign activity detection steps. At step 372, the method 370 detects the motion of the video through the motion detection that can be implemented on a GPU or CPU. At step 374, the method 370 computes the strength of the motion, for example by computing the RMS value of the frame differences, and at step 376, the method 370 smoothes the motion strength by using the motion smoother 362, such as a low pass IIR or FIR filter. At step 378, the method 370 compares the smoothed motion strength with the threshold values for example, a MOTION START threshold 324 and a MOTION END threshold 326 at step 380, the state machine 364 determines the state of the motion based on the smoothed motion strength compared with the threshold value.

Figure 3C:
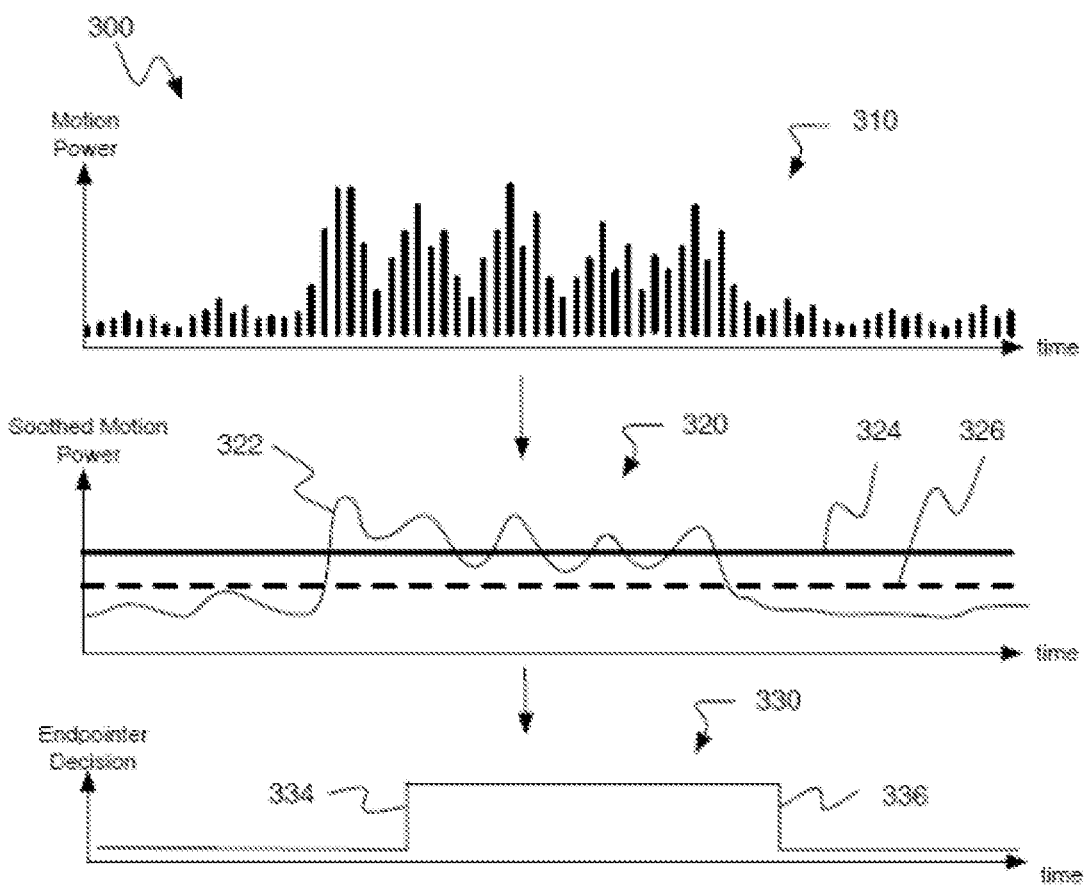
FIG. 3c depicts the signals associated with the motion activity detector.

Referring to FIG. 3c depicts the signals 300 associated with the motion activity detector. The figure depicts raw motion strength measurements in 310, which for example can be computed as Root Mean Square frame difference between video frames.

The motion can be measured using video frame differences and the frame difference can be computed as the RMS value of the pixel-wise intensity difference.

$$\text{RMS}(t) = \text{ROOT}(\text{SUM}\_i,j(\text{SQR}(\text{pixelValue}i,j(t) - \text{pixelValue}i,j(t-1)))) \quad (2)$$

The motion RMS value as a function of time is shown in 310.

The smoothed measurements are shown in 320. Line 322 depicts smoothed RMS values, the line 324 depicts the MOTION START THRESHOLD and the line 326 indicates the MOTION END THRESHOLD. Further, the activity detector decision is shown in 330. The low value of the line indicates that the state machine is in the NO SIGN ACTIVITY STATE 352 and the high value indicates that the state machine is in the SIGN ACTIVITY DETECTED STATE 356. The transition 358 from NO SIGN ACTIVITY STATE 352 to SIGN ACTIVITY DETECTED STATE 356 is indicated by the MOTION STARTED EVENT at 334, and the transition back 354 is indicated by the MOTION ENDED EVENT at 336.

Figure 3D:
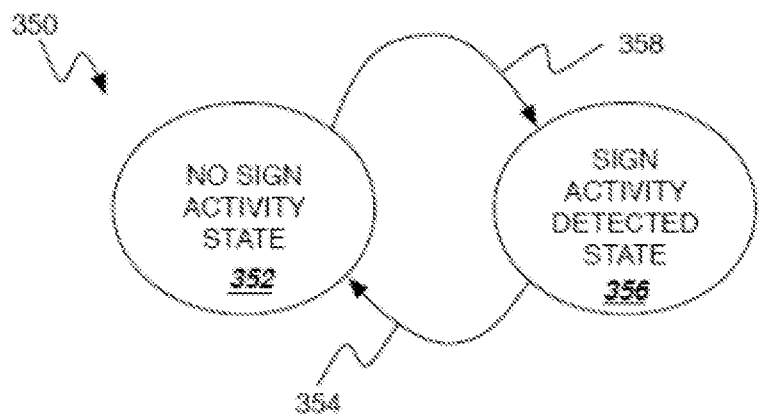
FIG. 3d illustrates a sign activity detector state machine 350 for detecting the motion of the sign-language video.

Referring to FIG. 3d illustrates a motion state activity transition diagram 350 for detecting the motion of the sign-language video. The initial state of the state machine can be the NO SIGN ACTIVITY STATE 352. The state machine can transition 358 from the NO SIGN ACTIVITY STATE 352 to the SIGN ACTIVITY DETECTED STATE 356 when the smoothed motion 322 exceeds the MOTION START THRESHOLD 234. The state machine can transition back 354 from the SIGN ACTIVITY DETECTED STATE 356 to the NO SIGN ACTIVITY STATE 352 when the smoothed motion drops below the MOTION END THRESHOLD 326. In an embodiment, the MOTION START THRESHOLD is higher than the MOTION END THRESHOLD. In an embodiment, the number of consecutive frames above the threshold is counted. The transition 358 from NO SIGN ACTIVITY DETECTED 352 to SIGN ACTIVITY DETECTED 356 can only happen after the number of consecutive frames above the threshold exceeds the MIN NUM_FRAMES_ABOVE_START_THRESHOLD. The MIN_NUM_FRAMES_ABOVE_START_ THRESHOLD can e.g. be 5-30 video frames.

In an embodiment, the different levels of the MOTION START THRESHOLD and the MOTION ENDED THRESHOLD and the requirement of the smoothed motion strength RMS value to exceed a minimum number of video frames results in a more stable estimate that does not fluctuate rapidly and incorrectly between states. For example, this prevents the Sign Activity Detector from accidentally triggering a MOTION STARTED EVENT when a small incidental motion is detected, such as a head tilt or seat adjustment. Similarly, this prevents the Sign Activity Detector from accidentally triggering the MOTION ENDED EVENT prematurely, for example, when the signer makes short pauses that are part of the language but do not represent the end of the phrase or utterance.

As a consequence of the above mechanisms, for preventing incorrect fluctuation between states of the Sign Activity Detector there can be a delay from the actual time when the sign motion starts until the time the MOTION STARTED EVENT it triggered. For this reason, a PRE-RECORDING-BUFFER mechanism is implemented to capture a segment of video before the MOTION STARTED EVENT.

Figure 4:
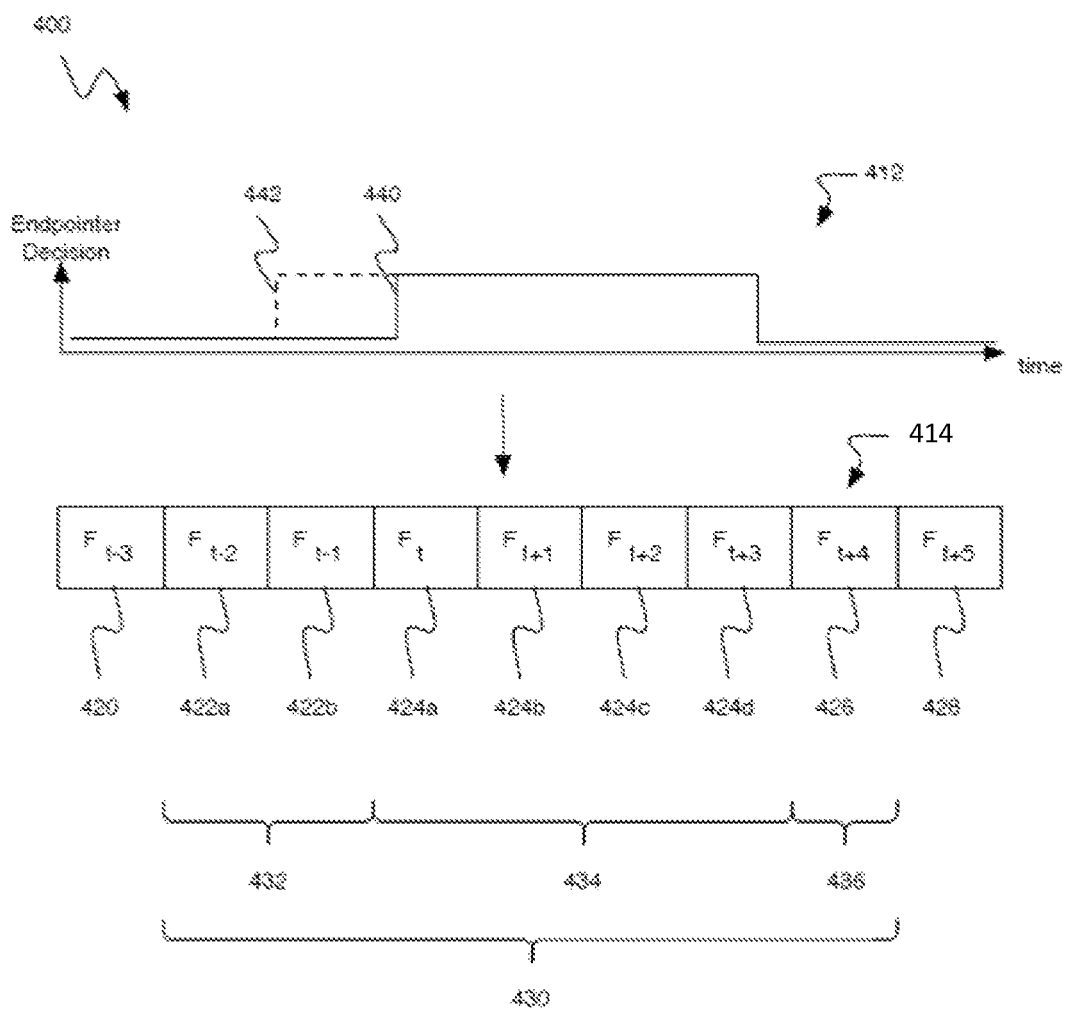
FIG. 4 illustrates an overview of the processing for motion detection and fragment selection.

Referring to FIG. 4 illustrates a state diagram for motion detection and PRE-RECORDING-BUFFER recording 400.

The Sign Activity Detector makes a decision as to whether the sign motion has started and or has ended. The decision as a function of time is shown in 412.

The state of the Sign Activity Detection has a time lag as described above. For example, it could take 30 high motion frames until the Sign Activity Detection transitions into the SIGN MOTION DETECTED STATE and triggers the MOTION STARTED EVENT. In this case, the lag-time could be for example up to 1 second. If the MOTION STARTED EVENT happens at time t0, 440, then the lag can be taken into account and the start time can be adjusted, for example by subtracting 1 second from the t0 442.

If the video recording is started when the Sign Activity Detection decision occurs, that is when the SIGN ACTIVITY STARTED EVENT is triggered, then the video will not include the first part of the signed utterance, and may cut off one or more signs or a partial sign. The Sign Activated Recording system includes a PRE-RECORDING-BUFFER technology that allows the system to access video footage prior to the Sign Activity Detector transitioning into the SIGN MOTION DETECTED STATE, and append that footage to the clip.

The PRE-RECORDING-BUFFER module stores a continuous sequence of video fragments 414 to a buffer that can be on disk. The video recording and storing of video fragments is independent of whether the system is recording a video clip or not. Each fragment can be for example 1 second long. In order to reduce the amount of storage, fragments that are older than n seconds are discarded if the recording has not commenced. For example, if n is 5, then 5 fragments are temporarily stored, that is the most recent 5 seconds are stored on a disk at any time. These 5 seconds of the video that are stored in the fragment buffer can be stored permanently if recording is started. In this way, the recording can be extended 5 seconds prior to the recording start was triggered, for example by a MOTION STARTED EVENT.

For example, a sequence of video fragments is shown in 414. During the recording of fragment Ft 424a, the PRE-RECORDING-BUFFER can store fragments F_t−1 through F_t−3, but older fragments can be discarded.

When used in conjunction with the Sign Activity Detection technology, the PRE-RECORDING-BUFFER allows the system to capture the whole signed utterance despite the decision lag of the Sign Activity Detection module. For example, the decision that motion has started happens, i.e. the MOTION STARTED EVENT is triggered at time t0 440 in the FIG. 4. This happens during the recording of video fragment $F_t$ 424a. The decision that motion has ended happens at t1 444. This happens during the recording of fragment $F_{t+3}$ 424d. However, actual motion started at time t0−1 during the recording of the frame $F_{t−1}$ 422b. The video clip of a whole signed utterance that is recorded to the disk 430 can be composed by fusing together fragments from F_t−2 422a to F_t+4 426. The clip can include the fragments $F_{t−1}$ 422b and $F_{t−2}$ 422a that happened before the MOTION STARTED EVENT and the fragment 426 after the MOTION ENDED EVENT. The video clip can thus be extended back in time because the fragments 422b and 422a were available in the PRE-RECORDING-BUFFER and had not been discarded.

Figure 5:
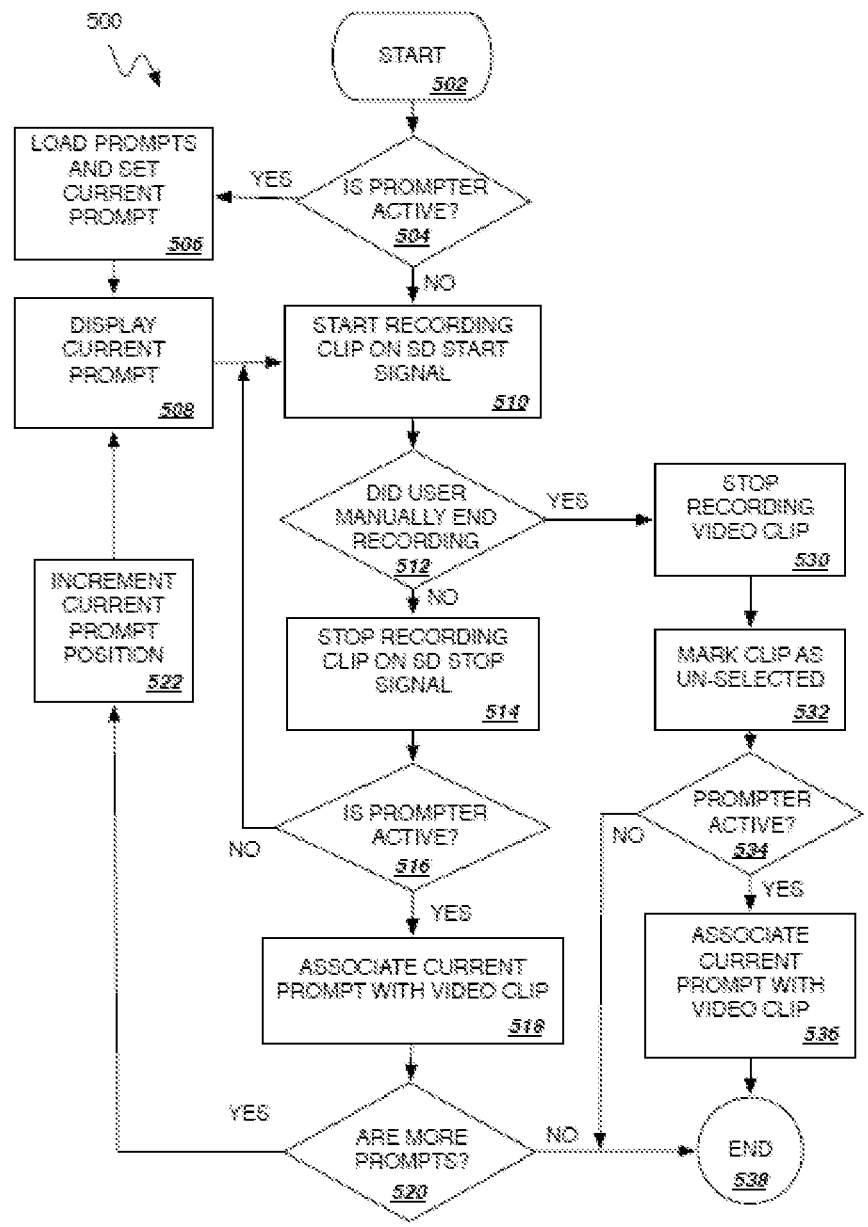
FIG. 5 illustrates this flow diagram for describing the process of Sign Activated Recording (SAR).

Referring to FIG. 5 illustrates a flow diagram for describing the process of Sign Activated Recording (SAR). At step 502 the process is initiated by the user. At this point the user positions themselves in front to the camera and comes to a stationary position. At step 504, the method 500 determines if the prompter is active. If the method 500 determines that the prompter is active, then at step 506, the method 500 loads the sequence of one or more prompter texts for the video recording project. Further, at step 508, the method 500 displays the current prompter text on the mobile interface. Otherwise, at step 510, the method 500 starts recording the sign-language video clip when the user starts signing the sentence or phrase and the SIGN ACTIVITY STARTED EVENT is detected. At step 512, the method 500 determines if the user manually ended the sign-language video recording by pressing the start/stop button. If the method 500 determines that the user has manually ended the sign-language video recording then the clip recording is terminated at step 530 and the method 500 marks the sign-language video clip as unselected at step 532. Further, if the method 500 determines that the prompter text is active at step 534 then at step 536, the method 500 associates the final sign-language video clip with the current prompter text. Otherwise, at step 514, the method 500 automatically stops recording when the user stops singing the sentence or phrase and the system receives the SIGN ACTIVITY ENDED EVENT. Further, at step 516, the method 500 checks if the prompter is still active and if the method 500 determines that the prompter is still active then at step 518, the method 500 associates the current prompter text with the video recording clip that was ended. Further, at step 520, the method 500 determines if there are more prompter texts available. If more prompts are available, the prompter text position is automatically incremented 522 and the method 500 shows the new prompter text on the display 508. If the prompter is active, the process repeats as long as there are more texts for the user to sign, or until the user ends the session. If the prompter is not active, the process continues as long as the signer continues to sign and pause, or until the signer ends the session. Otherwise, at step 520, the system determines that all texts have been displayed and associated video clips have been recorded and removes the prompter from the display of the mobile device and the recording session is ended 538.

Figure 6:
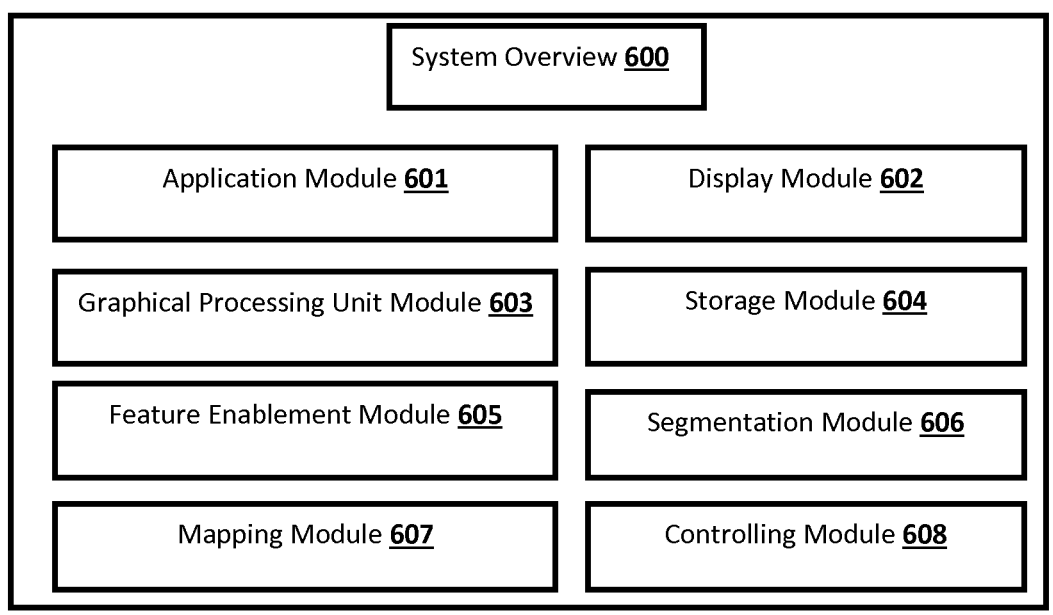
FIG. 6 illustrates a system overview of components 600 used to implement the method of enhancing the recording of the sign-language video on the mobile device.

Referring to FIG. 6 illustrates a system overview of components 600 used to implement the method of enhancing the recording of the sign-language video on the mobile device. In an embodiment, the system 100 comprises of an Application module 601, a Display module 602, a Graphical Processing Unit (GPU) module 603, a Storage module 604, a Feature Enablement module 605, a Segmentation module 606, a Mapping module 607, and a Controlling module 608. The Application module 601 is configured to install the mobile application 102 on the device. The Display module 602 is configured to display the mobile application 104 interface on the mobile device, wherein the mobile application 104 can be used to manage the sign-language recording video project(s). The Graphical Processing Unit (GPU) module 603 is configured to automatically record the sign-language video based on the gesture movement of the presenter detected by the module 603. In an embodiment, the GPU module 603 implements the Sign Activation Detection technology/feature. The Storage module 604 is configured to store the recorded sign-language video on a cloud server 103. In an embodiment, the Storage module 604 is implemented with a pre-recording buffer module to store the video fragments before recording the sign-language video.

The Feature Enablement module 605 is configured to enable a plurality of features supported by the mobile application 102. The Segmentation module 606 is configured to automatically create one or more segments in the recorded sign-language based on the phrases identified within the recorded sign-language video. In an embodiment, the Segmentation module 606 implements a Sign Activated recording technology/feature that recognize the motion of the signer in the video for automatic segmentation of phrases and trimming of clips while recording the sign-language video. The Mapping module 607 is configured automatically map/associate the prompter text with one or more segments identified within the recorded sign-language video. The Controlling module 608 is configured to transfer data across various modules required for implementing the method.

Figure 7:
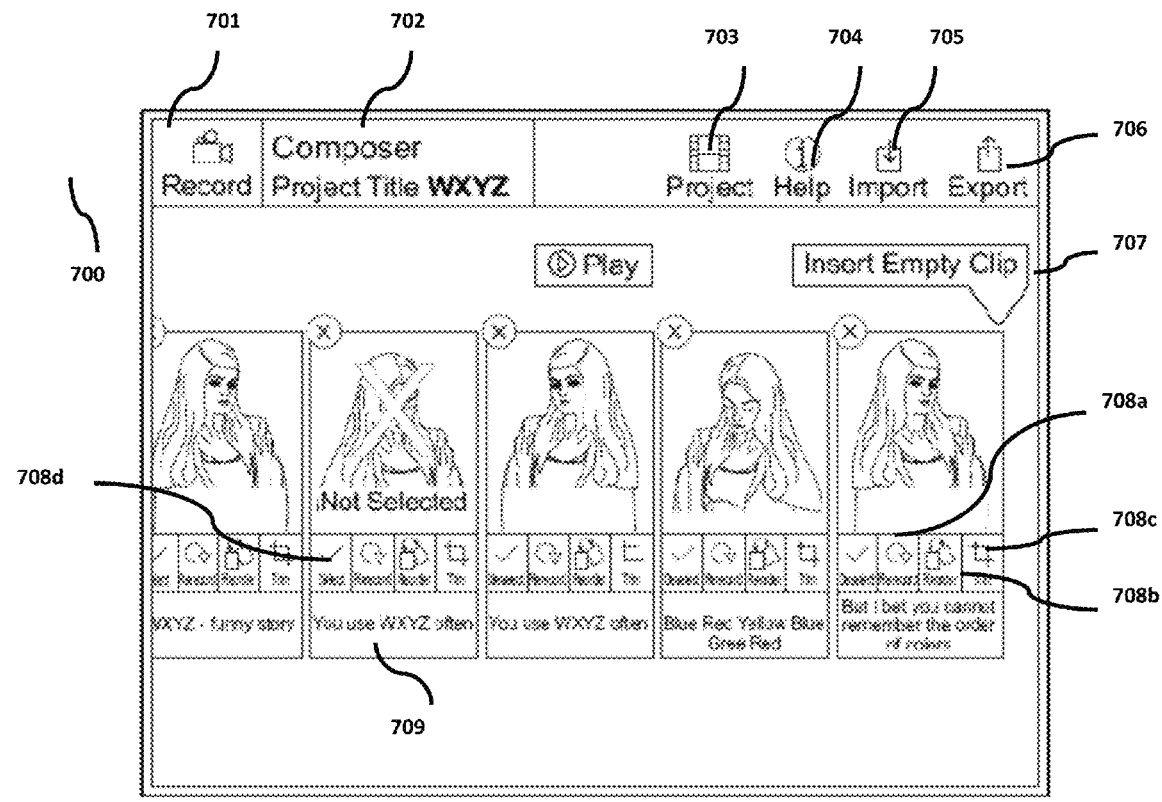
FIG. 7 illustrates an exemplary screen-shot that depicts the mobile interface composite user interface.

Referring to FIG. 7 illustrates an exemplary screen-shot that depicts the mobile interface composite user interface 700. In an embodiment, the application 104 interface allows the user to reorder the video frames by dragging the recorded video clips at the required location(s) or by interchanging the recorded video clips at the required location(s). In an embodiment, the user interface allows the user to perform the following functions: delete clips, select or deselect the clips that are included in the final composition 708*d*, edit the text associated with each clip that is used as a prompt text, title, or subtitle 709, access the trimming interface for each clip 708*c*, rerecord the video for a single video clip 708*a*, insert blank video-text units 707 that can be used to create project templates, access the recording interface 701, access the Project Manager interface 703, access the project export/import interface 705/706.

Figure 8A:
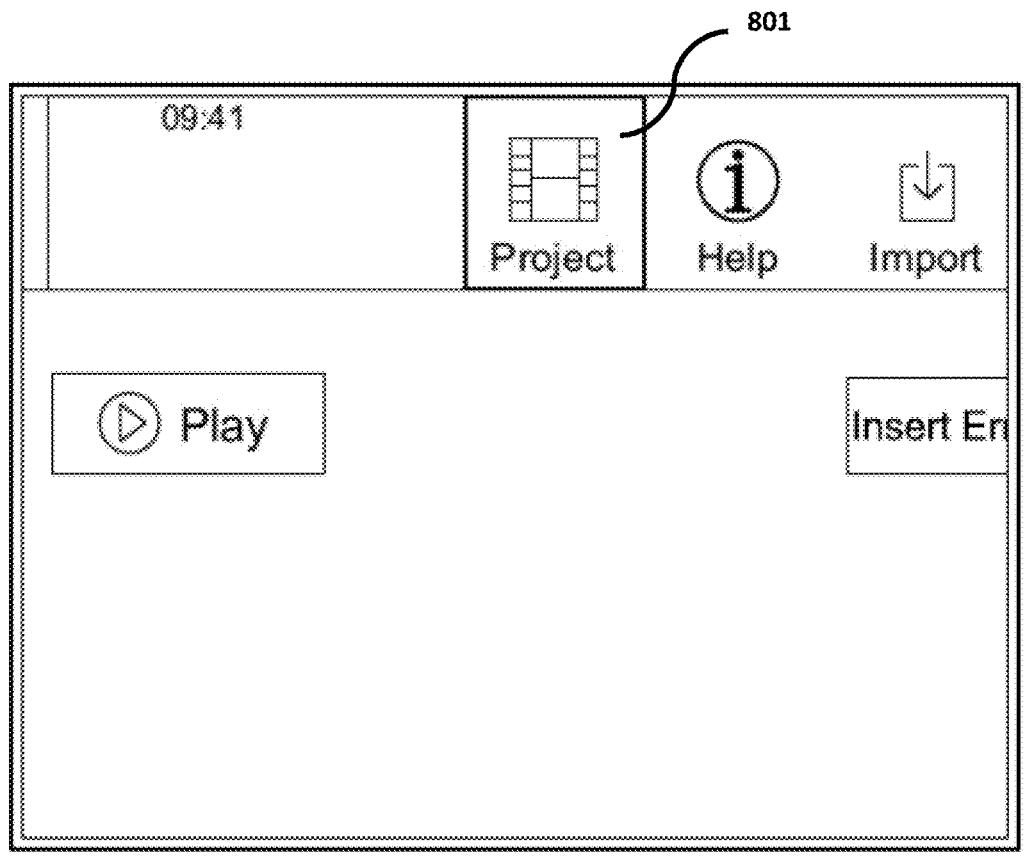
FIGS. 8a, 8b, and 8c illustrate exemplary screen-shots that depict a mobile interface for creating a new project for recording the sign-language video on the mobile device.
Figure 8B:
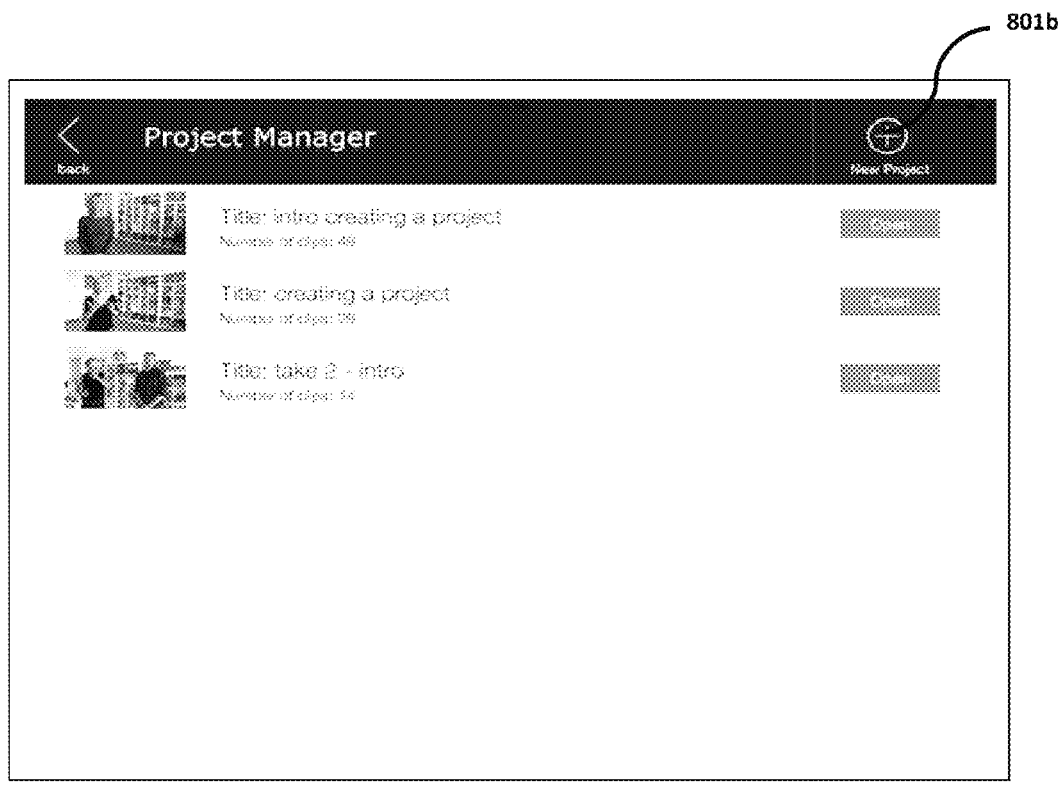
Figure 8C:
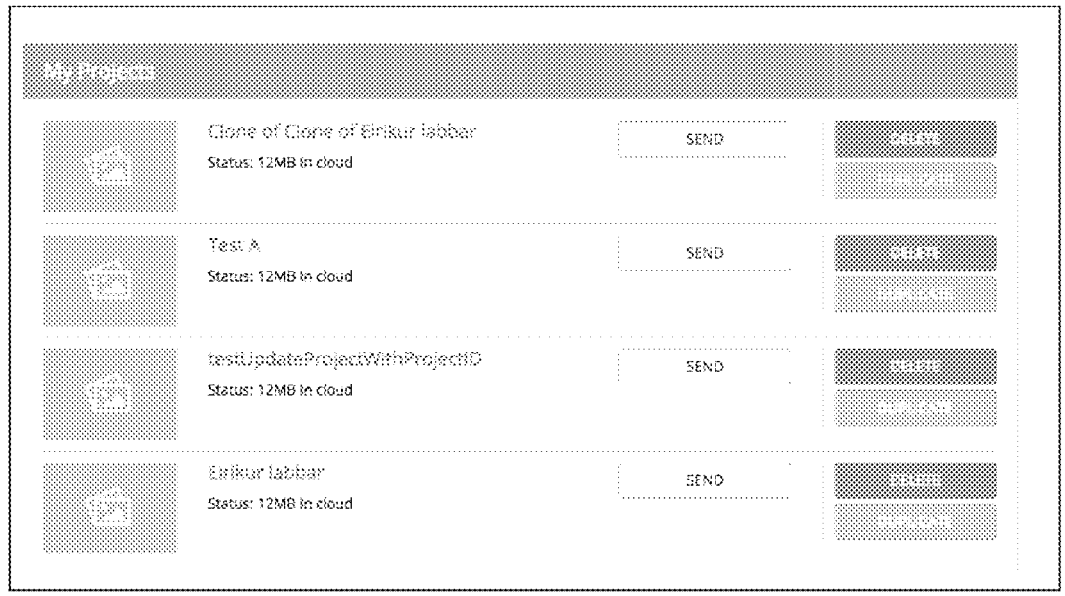

Referring to FIGS. 8*a*, 8*b*, and 8*c* illustrate exemplary screen-shots that depict a mobile interface for creating a new project for recording the sign-language video on the mobile device. As depicted in the figure, the application 104 interface allows the user to create new project(s) for recording the sign-language video within the system 100. The FIG. 8*a* illustrates a project button 801 in the composer user interface, wherein the project button 801 allows the user to access the project management interface, and access the button to create a new project 801*b*. The user interface shown in FIG. 8*b* allows the user to create and manage projects in the mobile application 104. The user interface shown in FIG. 8*c* allows the user to manage projects and collaborate in the web application.

Figure 9A:
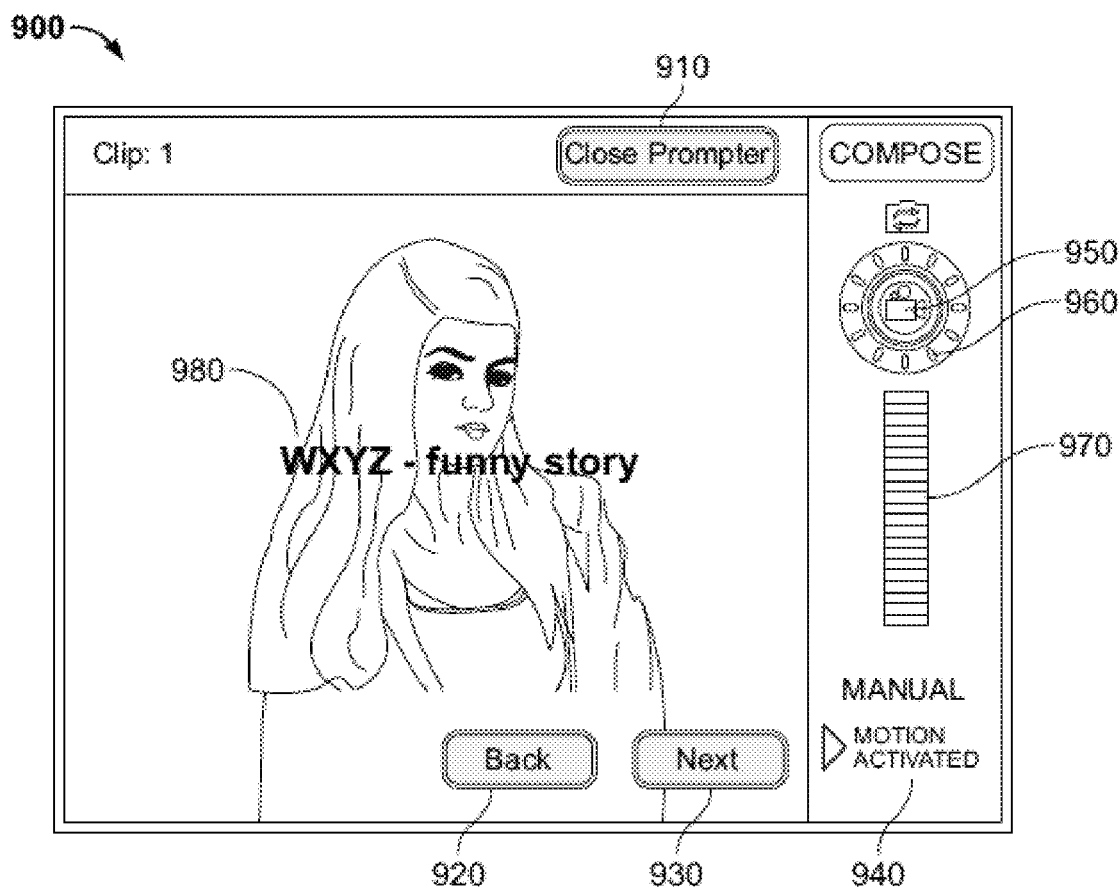
FIGS. 9a and 9b illustrate exemplary screen-shots that depict automatic recording based on the motion detected and displaying the prompter text associated with the segment(s) of the sign-language video recording.
Figure 9B:
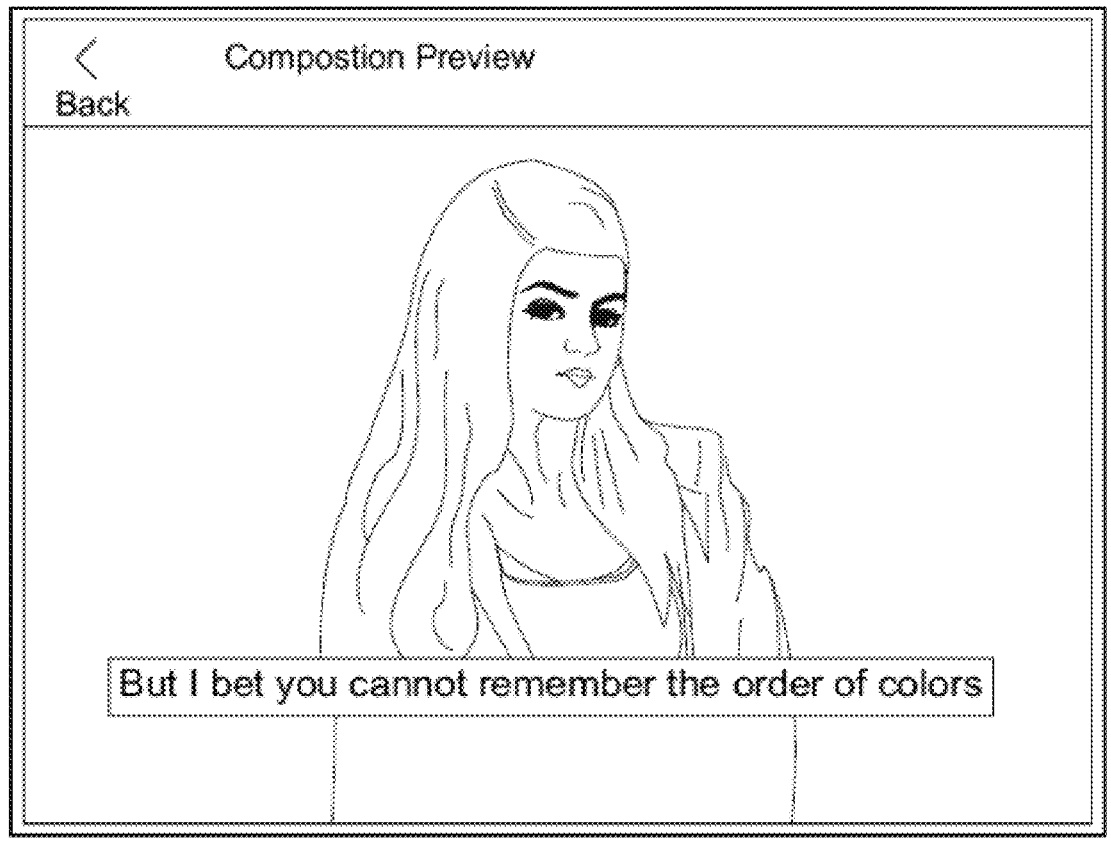

Referring to FIGS. 9*a* and 9*b* illustrate exemplary screen-shots that depict automatic recording based on the Sign Activity Detection and displaying the prompter text associated with the segment(s) of the sign-language video recording. This figure shows the real time image from the front facing camera of a tablet. If the prompter is open, the prompter text is overlaid over the image with a semi-transparent color. In an embodiment, the mobile interface 900 displays the prompter text and the option for allowing the user to select either a motion activated recording and/or the manual recording 940. Further, the mobile interface 900 allows the user to close the prompter text by selecting Close Prompter button 910. The motion activated recording records the sign-language video automatically based on the Sign Activity Detection and the manual recording is configured to allow the user to manually select the recording option 950, by depicting the motion strength indicator bar 970 and the recording indicator 960. In an embodiment, the prompter text 980 is displayed on the mobile interface 900 while recording the sign-language video and the application 104 implements a sign activated prompting technology/feature for prompting the user to record the sign-language video in a specific sequence, where the prompter text is automatically incremented when the user completes signing the prompt. Further, the Back and the Next buttons 920, 930 are used to move through the video frames. FIG. 9*b* shows the prompter text as a subtitle in the rendered video output in the Composition Preview interface.

Figure 10A:
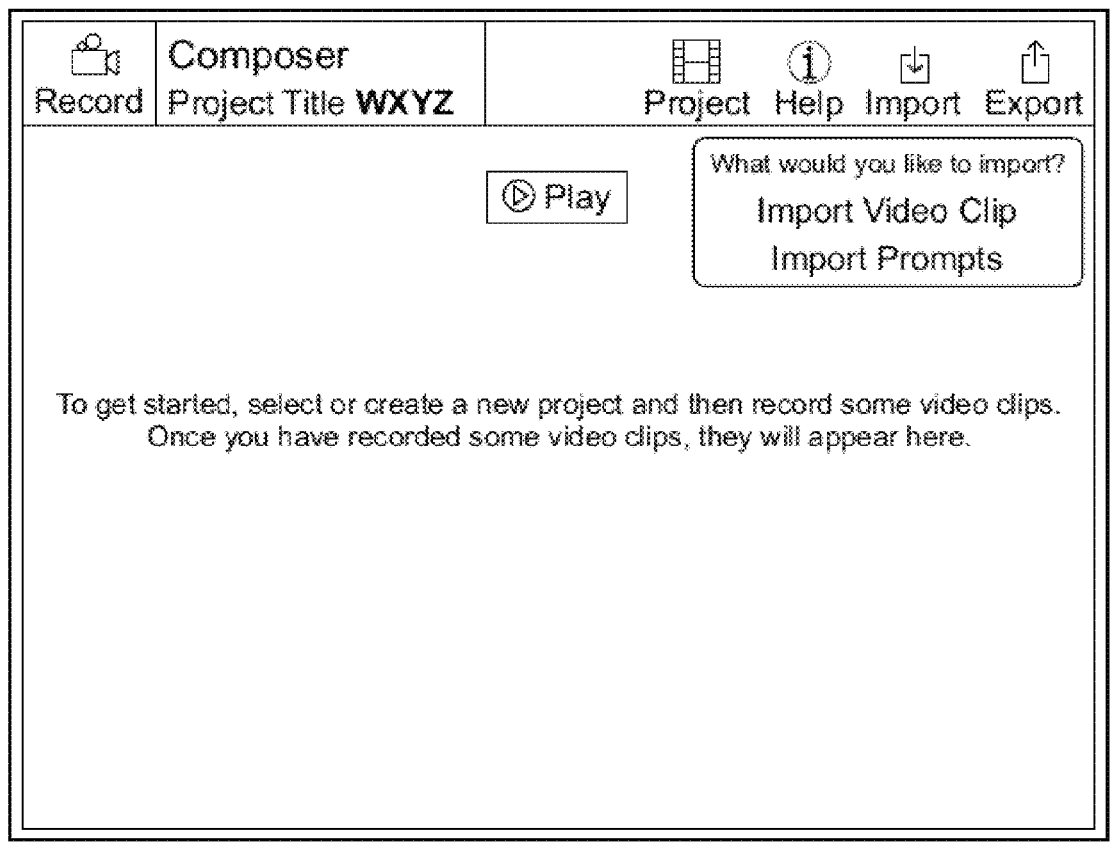

Referring to FIGS. 10*a* and 10*b* illustrate exemplary screen-shots for entering the prompter text to be automatically associated with the segment(s) of the sign-language video recording. As depicted in the figure, the application 104 interface allows the user enter prompts either by importing the text or by providing the text as input before recording the sign-language video.

Figure 11:
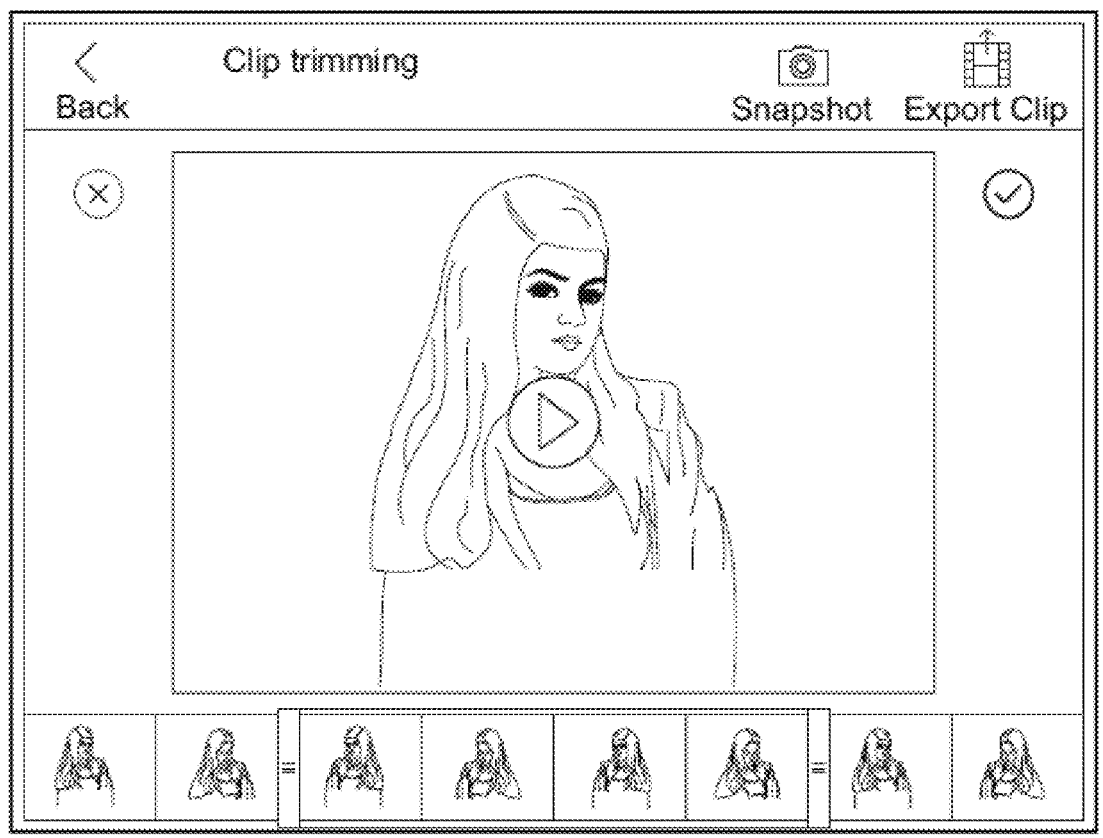
FIG. 11 illustrates an exemplary screen-shot that depict the mobile interface used for trimming or clipping the segment(s) of the sign-language video recording.

Referring to FIG. 11 illustrates an exemplary screen-shot that depict the mobile interface used for trimming or clipping the segment(s) of the sign-language video recording. In an embodiment, the web application 104 interface allows the user to select the video frames to be trimmed or clipped by performing a selection gesture on the recorded video frames.

The invention claimed is:

1. A method implemented in a mobile device for enhancing the recording of a sign-language video by automatically segmenting at least one phrase of said sign-language video recording and associating a text from an in-built teleprompter, wherein said method comprises of:
    facilitating said in-built teleprompter to generate a prompter text before recording the sign-language video;
    facilitating automatic recording of said sign-language video corresponding to the gesture movement of a presenter detected using a graphical processing unit (GPU) that can be automatically synchronized with the prompter text;
    facilitating automatic segmentation based on said at least one phrase associated with said recorded sign-language video;
    facilitating automatic collaboration, uploading, and storing the recorded sign-language video on a cloud server;
    associating the prompter text facilitated from said in-built teleprompter automatically with at least one segment identified in the recorded sign-language video as a text title;
    facilitating automatic control of the position of the prompter text corresponding to said at least one segment associated with said sign-language video recording; and
    implementing a plurality of features on said mobile device to enhance the recording of said sign-language video.

2. The method as claimed in claim 1, wherein the plurality of features implemented for enhancing the recording of the sign-language video comprises of:
    managing the projects related to the sign-language video through a mobile interface;
    reordering and trimming said at least one segment associated with said sign-language video recording as required by said presenter; and
    facilitating a means to export, upload, provide effects for the recorded sign-language video.

3. The method as claimed in claim 1, wherein the prompter text facilitated by said automatic teleprompter can be associated with said recorded sign-language video in one of the following ways: a prompter or a cue card for the presenter while presenting the recorded sign-language video, an interpreted text overlaid on the recorded sign-language video, a subtitle associated with said at least one segment of said sign-language video recording.

4. The method as claimed in claim 3, wherein the method implements a sign activated prompting technology for prompting the user to record the sign-language video in a specific sequence.

5. The method as claimed in claim 1, wherein the method creates said at least one segment in the recorded sign-language video by either manually specifying the recording start/stop event or by automatically recognizing the gesture movements of the sign-language performed by the presenter.

6. The method as claimed in claim 5, wherein the method implements a Sign Activated recording (SAR) technology/feature that recognize the motion of the signer in the video for automatic segmentation of at least one phrase and trimming of clips while recording the sign-language video.

7. The method as claimed in claim 2, wherein the method implements the plurality of features through a web application installed on said mobile device.

8. The method as claimed in claim 1, wherein the method associates the prompter text facilitated from said in-built teleprompter automatically with said at least one segment associated with the recorded sign-language video by implementing a motion detection technology in conjunction with a Sign Activity Detection technology.

9. The method as claimed in claim 1, wherein the method associates the prompter text facilitated from said in-built teleprompter automatically with said at least one segment associated with the recorded sign-language video by implementing a pre-recording buffer technology in conjunction with an Sign Activity Detection technology.

10. The method as claimed in claim 9, wherein the method implements a pre-recording buffer technology/mechanism to capture said at least one segment of video before recording the sign-language video.

11. The method as claimed in claim 10, wherein the pre-recording buffer technology/mechanism stores a continuous sequence of video fragments to a buffer that can be on disk and the video recording and storing of said video fragments is independent of whether the system is recording a video clip or not.

12. A system for enhancing the recording of a sign-language video by automatically segmenting at least one phrase of said sign-language video recording and associating a text from an in-built teleprompter, wherein said system comprises of: a Mobile device, a Mobile application module, a Web application module, a Cloud server, a Sign activation recording module, the Mobile device and the Cloud server comprising processing circuitry configured to:
facilitate said in-built teleprompter to generate a prompter text before recording the sign-language video;
facilitate automatic recording of said sign-language video corresponding to the gesture movement of a presenter detected using a graphical processing unit (GPU) that can be automatically synchronized with the prompter text;
facilitate automatic segmentation based on said at least one phrase associated with said recorded sign-language video;
facilitate automatic collaboration, uploading, and storing the recorded sign-language video on the cloud server;
associate the prompter text facilitated from said in-built teleprompter automatically with at least one segment identified in the recorded sign-language video as a text title;
facilitate automatic control of the position of the prompter text corresponding to said at least one segment associated with said sign-language video recording; and
implement a plurality of features on said mobile device to enhance the recording of said sign-language video.

13. The system as claimed in claim 12, wherein the plurality of features implemented for enhancing the recording of the sign-language video comprises of:
managing the projects related to the sign-language video through a web application module;
reordering and trimming said at least one segment of said sign-language video recording as required by said presenter through said web application module; and
facilitating a means to export, upload, and provide effects for the recorded sign-language video.

14. The system as claimed in claim 12, wherein the prompter text facilitated by said automatic teleprompter can be associated with said recorded sign-language video in one of the following ways: a prompter or a cue card for the presenter while presenting the recorded sign-language video, an interpreted text overlaid on the recorded sign-language video, a subtitle associated with said at least one segment of said sign-language video recording.

15. The system as claimed in claim 14, wherein the system is configured to implement a sign activated prompting technology for prompting the user to record the sign-language video in a specific sequence.

16. The system as claimed in claim 12, wherein the system is configured to create said at least one segment in the recorded sign-language video by either manually specifying the recording start/stop events or by automatically recognizing the gesture movements of the sign-language performed by the presenter.

17. The system as claimed in claim 16, wherein the system is configured to implement a Sign Activated recording (SAR) technology/feature that recognize the motion of the signer in the video for automatic segmentation of at least one phrase and trimming of clips while recording the sign-language video.

18. The system as claimed in claim 12, wherein the system is configured to implement the plurality of features through a web application installed on said mobile device.

19. The system as claimed in claim 12, wherein the system is configured to associate the prompter text facilitated from said in-built teleprompter automatically with said at least one segment associated with the recorded sign-language video by implementing a motion detection technology in conjunction with an Sign Activity Detection technology.

20. The system as claimed in claim 12, wherein the system is configured to associate the prompter text facilitated from said in-built teleprompter automatically with said at least one segment associated with the recorded sign-language video by implementing a fragment buffer technology in conjunction with a Sign Activity Detection technology.

21. The system as claimed in claim 12, wherein the system is configured to implement a pre-recording buffer technology/mechanism to capture said at least one segment of video before recording the sign-language video.

22. The system as claimed in claim 12, wherein the system is configured to implement a pre-recording buffer technology/mechanism for storing a continuous sequence of video fragments to a buffer that can be on a disk and the video recording and storing of said video fragments is independent of whether the system is recording a video clip or not.

* * * * *